United States Patent Office 3,812,130
Patented May 21, 1974

---

3,812,130
PROCESS FOR PREPARING NAPHTHALENE-1,8-DICARBOXYLIC ACID IMIDE
Josef Landler, Hofheim, Taunus, and Ernst Spietschka, Oberauroff, Taunus, Germany, assignors to Farbwerke Hoechst Aktiengesellschaft vormals Meister Lucius & Bruning, Frankfurt am Main, Germany
No Drawing. Filed July 24, 1972, Ser. No. 274,331
Int. Cl. C07d 39/00
U.S. Cl. 260—281         1 Claim

ABSTRACT OF THE DISCLOSURE

Process for preparing naphthalene-1,8-dicarboxylic acid-imide, wherein solid naphthalene-1,8-dicarboxylic acid-anhydride is reacted with gaseous ammonia at elevated temperatures. This process yields naphthalene-1,8-dicarboxylic acid imide in an almost quantitative yield and in a high purity, so that it may be directly used for the preparation of perylene-tetracarboxylic acid-diimide pigments.

---

The present invention relates to a process for preparing naphthalene-1,8-dicarboxylic acid imide, wherein solid naphthalene-1,8-dicarboxylic acid anhydride is reacted with gaseous ammonia.

The process of the invention is carried out in the following manner: naphthalene-dicarboxylic acid anhydride is introduced into a heatable pressure vessel provided with stirring means. The air in the reaction vessel is then replaced by an excess pressure of ammonia gas and the reaction vessel is heated, while stirring to 70° to 80° C. The reaction which proceeds exothermally starts at this temperature so that further heating is no longer necessary. Ammonia is then continuously introduced, while stirring, until the uptake is terminated. At that time the reaction mixture has reached a temperature of 120° to 130° C. Heating is then continued with a slight excess amount of ammonia and the reaction water that has formed is removed by distillation under reduced pressure. In this manner, naphthalene-1,8-dicarboxylic acid-imide is obtained in an almost quantitative yield and in a high purity.

Naphthalene-1,8-dicarboxylic acid imide is a valuable intermediate product in the preparation of pigments of the perylene-tetracarboxylic acid-diimide series. In the alkaline melt and under oxidation by air, there is formed from naphthalene-1,8-dicarboxylic acid-imide the perylene-tetracarboxylic acid-3,4,9,10-diimide, which passes into the perylene-tetracarboxylic acid-dianhydride by saponification. Condensation of this di- anhydride with aliphatic and aromatic amines carrying different substituents yields then the perylene-tetracarboxylic acid-diimide pigments.

In contra-distinction to the hitherto used process in which naphthalic acid-anhydride had been reacted at the boiling temperature with concentrated aqueous ammonia, the process of the invention has a number of advantages. In the process according to the invention the total reaction up to the dry final product can be carried out in one reaction vessel, so that each filtration and purification step is omitted. The reaction volumes are also smaller, which gives a better space-time yield. Furthermore, the energy consumption is smaller because the reaction proceeds without any further external supply of energy after starting by reason of the exothermal heat balance. The following Example illustrates the invention.

EXAMPLE 70 parts by weight of naphthalene-1,8-dicarboxylic acid-anhydride were placed into a drying pan. Then, gaseous ammonia (about 2 atmospheres gauge) was introduced and the whole was heated. The reaction set in at about 70° to 80° C. Heating was switched off and ammonia was further introduced until no further uptake. During that time the temperature rose and reached 105° to 130° C., depending on the quantity of ammonia added. The reaction time was about 2 to 3 hours during which about 6.5 parts by weight of ammonia were consumed. To complete the reaction, stirring was continued for 1 hour under pressure of ammonia gas of 2 atmospheres gauge. The reaction water that had formed in the meantime was eliminated under reduced pressure and the dry 1,8-dicarboxylic acid imide was discharged from the reaction vessel. The reaction yield was quantitative and amounted to 69.5 parts by weight.

We claim:
1. A process for forming naphthalene-1,8-dicarboxylic acid-imide, wherein solid naphthalene-1,8-dicarboxylic acid-anhydride is reacted with gaseous ammonia under pressure and at a temperature between 70° and 80° C.

References Cited

UNITED STATES PATENTS

| | | | |
|---|---|---|---|
| 1,796,011 | 3/1931 | Eckert | 260—281 |
| 3,546,227 | 12/1970 | Gmünder | 260—281 |
| 3,615,800 | 10/1971 | Spietschka | 260—281 |

FOREIGN PATENTS

| | | | |
|---|---|---|---|
| 386,057 | 12/1923 | Germany | 260—281 |

OTHER REFERENCES

Maki et al.: Chem. Abstr., vol. 47, col. 56858 (1953).
Dashevskii: Chem. Abstr., vol. 50, col. 9356c (1956).

DONALD G. DAUS, Primary Examiner

UNITED STATES PATENT OFFICE
CERTIFICATE OF CORRECTION

Patent No. 3,812,130                    Dated May 21, 1974

Inventor(s)   Landler et al.

It is certified that error appears in the above-identified patent and that said Letters Patent are hereby corrected as shown below:

In the Heading:

After "Ser. No. 274,331" insert

-- Claim Priority, application Germany,

July 26, 1971, P 21 37 242.9 --

Signed and sealed this 17th day of September 1974.

(SEAL)
Attest:

McCOY M. GIBSON JR.
Attesting Officer

C. MARSHALL DANN
Commissioner of Patents